March 13, 1945.  F. G. G. ARMSTRONG  2,371,122
CONTROL VALVE
Filed March 11, 1943
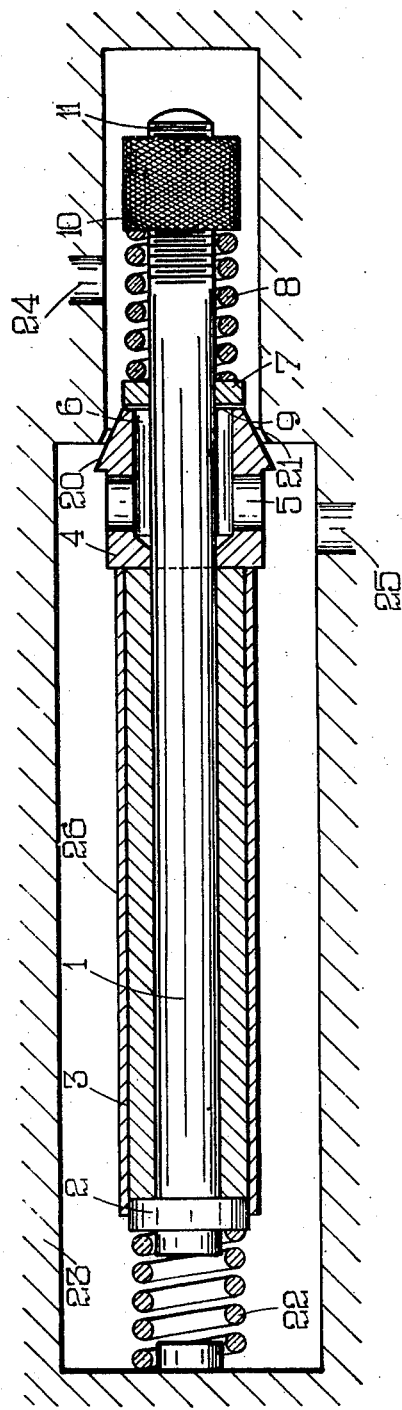
Inventor
Fullerton G. G. Armstrong
By
Mason, Porter & Diller
Attorneys Patented Mar. 13, 1945

2,371,122

UNITED STATES PATENT OFFICE 2,371,122

CONTROL VALVE

Fullerton George Gordon Armstrong,
Beverley, England

Application March 11, 1943, Serial No. 478,806
In Great Britain January 1, 1943

1 Claim. (Cl. 236—93)

The present invention relates to an improved assembly of two oppositely acting pressure release valves for controlling the flow of fluid.

An object of the invention is the provision of a simple, compact and robust assembly employing a single thermal responsive element of relatively soft or non-rigid material which will automatically compensate for differences in fluid viscosity, or again where it is desired to vary the flow past the valve according to differences in temperature of the fluid.

The invention and the advantages thereof will be understood from the following description of a typical embodiment with reference to the drawing in which there is shown an assembly of two oppositely acting pressure release valves partly in section and partly in elevation, with one valve partially open.

An assembly of two oppositely acting pressure release valves for controlling the flow of fluid comprises a hollow casing 23 whose interior is divided into two parts by a valve seat 21 defining a port between said parts.

Bores 24 and 25 serve as connections for fluid to the right and left hand parts (as shown) respectively of the interior of the casing 23.

A spindle 1 extends from one part of the casing interior into the other part and carries a member 4 which is axially bored so as to fit on and be displaceable along the spindle and is axially counterbored to form a passageway 6 and radially bored to form a passageway 5. The member 4 has a valve seat 9 formed on the end thereof and the passageways 6 and 5 provide a means for conducting fluid from the left hand part of the casing interior to the valve seat 9.

Coaxially formed with respect to the valve seat 9 is a valve head 20 which is conical in shape and complementary to the seat 21 in the casing.

A face of an enlarged portion 2 on the spindle 1 provides an abutment against one end of which a non-rigid thermal responsive tubular element 3 makes contact. The element 3 is made of soft material not capable of taking stress without deformation and loosely surrounds the spindle 1. The other end of element 3 makes contact with member 4. A sleeve of metal 26 forms a rigid support which surrounds the non-rigid element 3 and prevents distortion thereof in a radial direction due to the action of heat.

An element 7 is bored so as to be a sliding fit along spindle 1 and carries a valve head which is complementary to the seat 9 on the member 4.

Spring 8, whose pressure is adjustable by knurled nut 10 on a screwed end portion 11 of the spindle 1 urges the element 7 along the spindle towards the seat 9 on the member 4.

The pressure exerted by spring 8 on element 7 when the valve head on element 7 and the complementary seat 9 on member 4 are in any given relative position depends on the position along spindle 1 of member 4, which position is determined by the effect of temperature on the thermal responsive element 3.

A spring 22 acts between the end wall of the left side of the interior of the casing and the face of enlarged portion 2 of spindle 1 opposite to that face against which element 3 bears and urges spindle 1 together with element 3, sleeve 26, member 4 and other components carried thereon in the direction of the right hand side of the interior of the casing towards a position wherein the valve head 20 on member 4 makes contact with the seat 21 in the casing.

Thus the pressure of spring 22 on the spindle and consequently the force with which valve head 20 is urged towards seat 21 is, for any given relative position of the valve head and valve seat, varied in accordance with temperature.

The reason for such variations of spring pressure, arising from thermal expansion or contraction of element 3 differentially measured with respect to the spindle, is quite obviously due to the effect of spring "characteristic," that the pressure exerted by a spring is a function of its length.

I declare that what I claim is:

An assembly of two oppositely acting pressure release valves, for controlling the flow of fluid, comprising in combination a hollow casing whose interior is divided into two parts by a valve seat defining a port, a connection for fluid in each of the parts of the casing, a spindle extending from one part of the casing into the other part thereof, a member having a valve head complementary to the valve seat aforesaid and a valve seat coaxially formed on the member with respect to said head with means to conduct fluid through the member to the valve seat thereof carried by and displaceable along the spindle, an abutment on said spindle, a non-rigid thermal responsive tubular element loosely surrounding said spindle and having its ends in contact respectively with said abutment and said member, a rigid support surrounding said non-rigid element, an element displaceable along said spindle carrying a valve head complementary to the valve seat on said member, spring means carried by the spindle urging said valve head carrying element along the spindle towards the valve seat on said member whereby the pressure exerted by said spring means on said valve head carrying element when said valve head carrying element and said member are in any given relative position is varied in accordance with temperature, and a second spring means acting between the casing and the spindle urging the spindle together with the thermal responsive element and said member towards a position wherein the valve head on said member makes contact with the valve seat in the casing whereby the pressure of said second spring on the spindle when the valve head of said member and the valve seat of the casing are in any given relative position is varied in accordance with the temperature.

FULLERTON GEORGE
GORDON ARMSTRONG.